United States Patent [19]

Moggi et al.

[11] Patent Number: 4,840,994

[45] Date of Patent: Jun. 20, 1989

[54] COMPOSITIONS BASED ON FLUOROELASTOMERS AND ON MODIFIED OLEFINIC POLYMERS

[75] Inventors: Giovanni Moggi, Milan; Gianna Cirillo, Genova; Mauro Aglietto; Enzo Benedetti, both of Pisa, all of Italy

[73] Assignee: Ausimont S.p.A., Milan, Italy

[21] Appl. No.: 208,038

[22] Filed: Jun. 17, 1988

Related U.S. Application Data

[63] Continuation of Ser. No. 205,175, Jun. 15, 1988.

[30] Foreign Application Priority Data

Jun. 19, 1987 [IT] Italy ................... 20956 A/87

[51] Int. Cl.$^4$ ............ C08L 51/06; C08L 27/16; C08L 27/18; C08L 27/22
[52] U.S. Cl. .................... 525/72; 525/102; 525/199; 524/504
[58] Field of Search ............ 525/72, 199, 102

[56] References Cited

U.S. PATENT DOCUMENTS 4,197,380 4/1980 Chao et al. ............... 525/199
4,575,533 3/1986 Horie et al. ............... 525/72
4,575,537 3/1986 Ueno ........................ 525/199

*Primary Examiner*—Carman J. Seccuro
*Attorney, Agent, or Firm*—Stevens, Davis, Miller & Mosher

[57] ABSTRACT

Fluoroelastomer compositions vulcanizable with peroxides having improved processability and compatibility properties and comprising, as additives, ethylene polymers and ethylene-propylene or ethylene-butene copolymers having, along the polymer chain, ester groups of the type—COOR where R is a $C_1$–$C_8$ alkyl, wherein the ester groups amount to 0.5–10% by weight as referred to the total polymer. Such polymer additives contain the ester group bound to a carbon atom of the chain either directly or through a —$CH_2$— or in the form

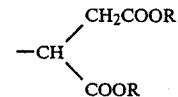

where R is a $C_1$–$C_8$ alkyl group.

5 Claims, No Drawings

COMPOSITIONS BASED ON FLUOROELASTOMERS AND ON MODIFIED OLEFINIC POLYMERS

DESCRIPTION OF THE INVENTION

This application is a continuation of our prior co-pending application Ser. No. 205,175, filed June 10, 1988.

The present invention relates to polymer compositions based on a fluoroelastomer vulcanizable with peroxide or ionic or mixed ionic-peroxide vulcanization, and on an ethylene polymer or on an ethylene/propylene or ethylene/butene-1 copolymer of the amorphous type, the ethylene polymer of copolymer having along the polymer chain a few ester groups —COOR (where R is an alkyl with 1 to 8 C), in such amount that the ester group constitutes from 0.5% to 10% by weight of the total polymer. The ester groups are bound to the carbon atoms of the polymer chain either directly or through a —CH$_2$— radical or in the form

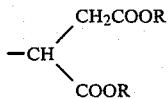

where R is a $C_1$–$C_8$ alkyl group.

The above polymer additives are utilized in the composition with the fluoroelastomer in the amount of 0.5 to 5 parts by weight, and preferably 1 to 3 parts, per 100 parts by weight of rubber.

The elastomer compositions of the invention exhibit, with respect to the fluoroelastomer as such, generally improved processability properties, and especially a better extrudability.

The polymer additives according to this invention may be selected from polyethylene or from the ethylene/propylene copolymers having a weight ratio between the monomers ranging from 95/5 to 30/70, and preferably from 90/10 to 50/50.

The starting fluoroelastomer may be used also in the form of a blend with elastomers such as the ethylene/propylene copolymer (EPR) of the type defined in Kirk-Othmer "Encyclopedia of Chemical Technology", 3rd Ed., Vol. 8, page 422 (1979). The latter (non-fluorinated) elastomer is utilized in an amount equal to 5 to 50 parts by weight per 100 parts by weight of fluoroelastomer.

The polymer additives according to this invention may be prepared by known methods described in the technical literature, for example in Polymer Engineering and Science, 26 (1) 9 (1986), and references cited therein.

Particularly suitable is the method which is based on the reaction among the polyolefin, an organic peroxide, and diethylmaleate at 130°–200° C.

A method which permits introducing the group —CH$_2$COOR into the polyolefinic chain is described in Aglietto et al, "Atti dell'8°" Convegno Nazionale della Soc. Chim. Italiana Divisione Chimica Industriale, Trento 8–10, Ottobre '86, page 80.

The polymeric additives according to the present invention impart to the fluoroelastomer composition the following characteristics:

a high processability, in particular as regards processing in the extruder;

an improved compatibility of the fluoroelastomers with ethylene/propylene elastomer copolymers (EPR), with improved vulcanization rates of such blends and an improved extrudability in comparison to the blend without said additive;

improved elastomer properties of the blend with EPR after vulcanization;

decrease in the Mooney viscosity of the blends.

As types of fluoroelastomers which are vulcanizable with peroxides or by an ionic system and which are well suited to be used in the present invention, the following can be cited:

$CH_2=CF_2/C_3F_6$ copolymers and vinylidene fluoride/hexafluoropropene/tetrafluoroethylene terpolymers optionally containing peroxy cure sites, vinylidene fluoride/chlorotrifluoroethylene copolymers optionally containing tetrafluoroethylene, fluoro-silicone rubbers containing peroxy cure sites, rubber blends in which at least one rubber is vulcanizable with peroxides or with mixed vulcanization systems, in particular fluoroelastomer blends based on $CH_2=CF_2$ and on $C_2F_4/C_3H_6$ elastomeric copolymer of the type AFLAS®, $C_2F_4$ with perfluoroalkylvinylether of the type KALREZ®, and blends of a fluoroelastomer based on $CH_2=CF_2$ and on EPR rubbers.

The fluoroelastomers containing peroxy cure sites are prepared according to conventional methods by using, during the polymerization step, small amounts of brominated co-monomers (brominated olefins, brominated perfluorovinylethers, etc.).

As ingredients for obtaining vulcanizable compositions from the above fluoroelastomers there are used those known in the art, such as those listed below:

Peroxide vulcanizing agent

This consists of an organic peroxide, such as e.g., benzoyl peroxide, dicumyl peroxide, 2,5-dimethyl-2,5-di(t.butylperoxyl)hexane, alpha, alpha'-bis(t.butylperoxy)diisopropylbenzene, aliphatic or cyclic bis-peroxycarbamates.

Radical vulcanizing co-agent

This consists of an unsaturated compound (di-, tri-, or polyfunctional), such as for example triallylcyanurate, triallylisocyanurate, divinylbenzene, m-phenyl-bis(-maleimide).

In the case of an ionic vulcanization or of a mixed ionic-peroxide vulcanization it is possible to use for example:

Bis-nucleophilic vulcanizing agent

This consists of a diamine derivative or of an aromatic polyhydroxy compound as described in U.S. Pat. No. 3,876,654 (Du Pont).

Vulcanization accelerator

This consists of a quaternary ammonium salt as described in U.S. Pat. No. 3,655,727 (3M), or of a quaternary phosphonium salt as described in U.S. Pat. No. 3,876,654, or a phosphoranaminic compound as is described in U.S. Pat. No. 4,259,463 (ME).

For both types of vulcanizing there are furthermore used:

Reinforcing fillers

Carbon black, silica, etc.

Acidity acceptors

As for example the oxides of lead, zinc, calcium, magnesium.

In the fluoroelastomeric compositions of the prior art, products such as vegetable waxes, low molecular weight polyethylene, various long-chain stearates, polyesters, octadecylamines and the like were used as plasticizers or lubricants.

The use of such co-adjuvants was necessary owing to the poor extrudability properties of the blends and to the phenomena of adhesion to the molds and fouling of same.

The known processing co-adjuvants sometimes give rise to problems of interference with the peroxide vulcanization system and of bad surface appearance of the molded article.

Furthermore, in order to impart to the fluoroelastomers the well-known properties of resistance to heat, to chemical agents, and to solvents, it is absolutely necessary to subject the fluoroelastomers to post-curing at temperatures ranging in general from 190° to 250° C. for a time of from 10 to 30 hours. During such step, however, the common plasticizers (polyglycols, stearates, organic phosphates, oleates, phthalates, etc.) volatilize and/or decompose. This results in a marked decay of the mechanical properties of the final articles; and in particular:

excessive increase in hardness;
decay of the compression-set resistance;
decay of the elastic properties (low elongation value and high modulus value);
low thermal stability, which prevents use under severe applicative conditions.

In conclusion, the advantages obtainable in the processing step result in unacceptable disadvantages in the final articles.

Thus, the use of plasticizers or lubricants is limited to small amounts (1-2 p.h.r.), which do not sensibly alter the final properties of the vulcanizates, but, on the other hand, are insufficient to meet the above requirements.

It was observed in particular that the use of perfluorosilicone oils permits one to lower the hardness by 4-5 points, but it raises some difficulties as regards admixing and incorporation into the fluoroelastomer due to incompatibility between the two polymeric systems. Furthermore, a lowering in the vulcanization rate as well as a worsening of the compression set value and of the heat resistance value were encountered.

It has, surprisingly, been discovered that by using additives according to the present invention in amounts ranging from 0.5 to 5 parts by weight per 100 parts of rubber, and preferably from 1 to 3 parts by weight, blends based on fluoroelastomers only, or on fluoroelastomer/EPR blends, may be obtained which—the other ingredients being the same (rubbers, cross-linking agents, acidity acceptors)—exhibit a superior behavior as regards processability, as is evidenced by the lowering of the minimum torque, good extrudability (Garvey test), as well as by favorable elastomeric properties and adhesion of the vulcanizate to metal substrates.

An increase in the cross-linking rate is observed when the elastomer matrix contains, besides the fluoroelastomer of the above type based on vinylidene fluoride, also another elastomer comprising hydrogenated olefins, such as the tetrafluoroethylene/propylene copolymer (AFLASA ®), or the ethylene/propylene/diene terpolymer (EPDR). See Examples 7-9 below.

In all cases, a lowering of the minimum torque was observed, which is indicative of a better processability of the blends.

The compatibilizing effect of polymeric additive EP containing ester groups is evidenced by infrared spectrometry. In fact, the carbonyl band which, in the additive, is present at 1739 cm$^{-1}$, shifts to 1734 cm$^{-1}$ if it is present in an amount of 5% by weight in the blend with a fluoroelastomer based on vinylidene fluoride owing to the interactions between the carbonyl group of the additive and the methylene groups of the fluorinated elastomer. The long sequences of olefin units $C_2H_4$ or $C_2H_4/C_3H_6$ intercalated in the carbonyl groups secure, conversely, the desired compatibility with the EPR elastomer composed of $C_2H_4/C_3H_6$ sequences.

The following examples are given merely to illustrate the applicative possibilities of the present invention, but without limiting its scope.

EXAMPLES 1-9

Following conventional mixing techniques, there were prepared rubber blends comprising the ingredients indicated in Tables 1, 2, 3. The amounts therein are expressed as parts by weight.

Using the blends so prepared, the tests and determinations indicated in Tables 1, 2, 3 were carried out, with the results shown:

Ingredients used in the blends

Elastomer 2: terpolymer $CH_2=CF_2/C_3F_6/C_2F_4$ in a 2/1/1/ molar ratio, containing as a cure site monomer a brominated olefin, having a Mooney viscosity ML (1+4) at 100° C. equal to 120 and a total bromide content of 3,500 ppm (VITON ® GF);

Elastomer 3: $C_2H_4/C_3H_6$ copolymer in a 55/45 weight ratio, having a Mooney viscosity ML (1+4) at 100° C. equal to 40 (DUTRAL ® CO 054);

Elastomer 1: $CH_2=CF_2/C_3F_6$ copolymer in a 79/21 molar ratio, having a Mooney viscosity ML (1+4) at 100° C. equal to 75 (TECNOFLON NM ®);

Luperco ® 101 XL = 2,5 dimethyl-2,5-di(tert.1-butylperoxy)-hexane product at 45% by weight, with 55% of an inert filler;

TAIC: triallylisocyanurate;

Blanck MT: carbon black for rubbers (ASTM N 990);

Accelerator: 1-chloro, 1-benzyl, 1,1-diphenyl-N-diethyl-phosphoranamine;

Bisphenol AF: hexafluoroisopropylidene-bis(4-hydroxybenzene);

Additive 1: This was prepared by reacting an ethylene/propylene copolymer (weight ratio: 55/45) having a Mooney viscosity ML (1+4) at 100° C.=40 with diethylmaleate and dicumyl peroxide at 190° C., thereby obtaining a degree of functionalization of 4% by weight of groups —$COOC_2H_5$ in the polymer chain;

Additive 2: This was based on high density polyethylene with diethylmaleate and dicumyl peroxide at 190° C., thereby obtaining a degree of functionalization of 3% by weight of groups —$COOC_2H_5$ in the polymer chain.

These additives are preparable according to the description in "Polymer Engineering and Science", Vol. 26, No. 1, pages 9-14 and cited references, or according to the description in Italian patent application No. 48950 A/85, or in the previously cited technical literature, on page 3 (Aglietto et al).

Method of anlaysis used
(1) ASTM D-2084
(2) ASTM D-1646
(3) ASTM D-2230-78 (a) Method B; (b) Method A–System B
(4) ASTM D-412
(5) ASTM D-2240
(6) ASTM D-395 - Method B
(7) ASTM D-1329

Detachability s=poor
d=rather good
b=good.

EXAMPLES 1-3

Comparison Examples 1 reports the results obtained with a blend prepared and vulcanized according to the prior art by means of the ionic system with bisphenol.

Examples 2 and 3 report the data relating to blends respectively containing 2 and 5 parts of additive 1.

A decrease in the Mooney viscosity value of the blends will be observed, which is indicative of a better processability, as well as an improvement in the extrudability test.

EXAMPLES 4-6

Comparison Example 4 reports the results obtained with a blend prepared and vulcanized according to the prior art by means of the peroxide system, and a comparison is made with the blends of Examples 5 and 6 which contain additive 1.

Improvements in the Mooney viscosity value of the blend and in the extrudability test were obtained.

EXAMPLES 7-9

Example 7 relates to a fluoroelastomer/EPR 80/20 blend (comparison); the blends of Examples 8 and 9 contained polymer additives 1 and 2, respectively.

Improvements in the Mooney viscosity value of the blend, in the extrudability, and in the compression set were observed.

TABLE 1

|  | Ex. 1 | Ex. 2 | Ex. 3 |
| --- | --- | --- | --- |
| Elastomer 1 (UM) | 100 | 100 | 100 |
| Additive 1 | — | 2 | 5 |
| Accelerator | 0.5 | 0.5 | 0.5 |
| Bisphenol AF | 1.9 | 1.9 | 1.9 |
| Maglite DE | 3 | 3 | 3 |
| Ca(OH)$_2$ | 6 | 6 | 6 |
| Black Mt N-990 | 30 | 30 | 30 |
| Characteristics of the blends | 14 | 13 | 12 |
| ODR at 180° C., 100 cpm, arc ± 5 (1) |  |  |  |
| ML (lb. p. in.) |  |  |  |
| MH at 5' (lb. p. in.) | 173 | 130 | 88 |
| Ts2 | 2'1" | 2'4" | 2'10" |
| Ts50 | 2'57" | 3'10" | 3'27" |
| Mooney value of the blend (2) | 86 | 76 | 70 |
| ML 1+10 |  |  |  |
| Extrudability test (3) | 34 | 37 | 39 |
| flow rate (g/min.) (a) |  |  |  |
| Garvey rating (b) | 8 | 9 | 10 |
| Characteristics of the vulcanizates (vulcanization in press at 170° C. for 10 minutes and in oven at 250° C. for 24 hours) |  |  |  |
| Modulus (Mpa) (4) | 8.7 | 8.6 | 8.2 |
| Tensile strength (Mpa) (4) | 16.3 | 15.9 | 14.4 |
| Elongation at break (%) (4) | 159 | 150 | 143 |
| Shore hardness A (points) (5) | 75 | 75 | 77 |

TABLE 2

|  | Ex. 4 | Ex. 5 | Ex. 6 |
| --- | --- | --- | --- |
| Elastomer 2 | 100 | 100 | 100 |
| Additive 1 | — | 2 | 5 |
| Luperco 101 XL | 3 | 3 | 3 |
| Diak 7 | 3 | 3 | 3 |
| PbO | 3 | 3 | 3 |
| Black Mt N-990 | 30 | 30 | 30 |
| Characteristics of the blends | 20 | 24 | 20 |
| ODR at 180° C., 100 cpm, arc ± 5 (1) |  |  |  |
| ML (lb. p. in.) |  |  |  |
| MH at 5' (lb. p. in.) | 102 | 90 | 73 |
| Ts2 | 1'9" | 1'8" | 1'7" |
| Ts50 | 2'18" | 3'12" | 4'8" |
| Mooney value of the blend (2) | 101 | 83 | 64 |
| ML 1+10 (121° C.) |  |  |  |
| Extrudability test (3) | 32 | 32 | 32 |
| flow rate (g/min.) (a) |  |  |  |
| Garvey rating (b) | 6 | 7 | 8 |
| detachability | s | d | b |
| Characteristics of the vulcanizates (vulcanization in press at 170° C. for 10 minutes and in oven at 250° C. for 24 hours) |  |  |  |
| Modulus (Mpa) (4) | 6.5 | 7.0 | 7.7 |
| Tensile strength (Mpa) (4) | 19.4 | 18.5 | 17.9 |
| Elongation at break (1%) (4) | 216 | 212 | 209 |
| Shore hardness A (points) (5) | 75 | 77 | 78 |

TABLE 3

|  | Ex. 7 | Ex. 8 | Ex. 9 |
| --- | --- | --- | --- |
| Elastomer 2 | 80 | 80 | 80 |
| Elastomer 3 | 20 | 20 | 20 |
| Additive 1 | — | 2 | — |
| Additive 2 | — | — | 3 |
| Luperco 101 XL | 3 | 3 | 3 |
| Diak 7 | 3 | 3 | 3 |
| PbO | 3 | 3 | 3 |
| Black Mt N-990 | 30 | 30 | 30 |
| Characteristics of the blends | 17 | 14 | 15 |
| ODR at 180° C., 100 cpm, arc ± 5 (1) |  |  |  |
| ML (lb. p. in.) |  |  |  |
| MH at 5' (lb. p. in.) | 118 | 111 | 120 |
| Ts2 | 1'3" | 0'57" | 1'1" |
| Ts50 | 1'35" | 1'39" | 1'30" |
| Mooney value of the blend (2) | 90 | 82 | 90 |
| ML 1+10 (121° C.) |  |  |  |
| Extrudability test (3) | 32 | 32 | 32 |
| flow rate (g/min.) (a) |  |  |  |
| Garvey rating (b) | 6 | 8 | 8 |
| detachability | s | d | b |
| Characteristics of the vulcanizates (vulcanization in press at 170° C. for 10 minutes and in oven at 250° C. for 24 hours) |  |  |  |
| Modulus (Mpa) (4) | 9.3 | 8.8 | 9.1 |
| Tensile strength (Mpa) (4) | 12.2 | 11.2 | 11.5 |
| Elongation at break (%) (4) | 137 | 129 | 131 |
| Shore hardness A (points) (5) | 80 | 79 | 79 |
| Compression set on O-ring No. 214 at 200° C. for 70 hours (6) |  |  |  |
| C.S. % | 31 | 27 | 28 |
| TR$_{10}$ (°C.) | −10 | −11.1 | −11 |

What is claimed is:

1. Fluoroelastomer compositions vulcanizable with peroxide and/or ionic vulcanization, comprising from 0.5 to 5 parts by weight, per 100 parts by weight of fluoroelastomer, of an ethylene homopolymer or of an ethylene/propylene or ethylene/butene-1 copolymer of the amorphous type and containing ester groups —COOR, R=an alkyl with 1 to 8 C, along the polymeric chain, in amounts equal to 0.5%–10% by weight referred to the olefin polymer, said ester groups being bound to carbon atoms of the polymer chain either directly or through a —CH$_2$— radical or in the form

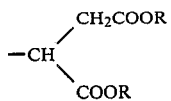

where R is a $C_1$–$C_8$ alkyl group.

2. Fluoroelastomer compositions according to claim 1, wherein the fluoroelastomer is selected from the class consisting of:
(a) copolymers of $CH_2$=$CF_2$ with perfluoropropene;
(b) copolymers of $CH_2$=$CF_2$ with $CF_2$=CFCl;
(c) fluorosilicone rubbers containing cure site peroxides;
(d) copolymers of $CF_2$=$CF_2$ with perfluoroalkylvinylethers; and
(e) copolymers of $CF_2$=$CF_2$ with propylene.

3. Fluoroelastomer compositions according to claim 2, wherein under (a) there may also be present tetrafluoroethylene and co-monomers acting as a cure site for the peroxide vulcanization.

4. Fluoroelastomer compositions according to claim 1, wherein the fluoroelastomer is present in admixture with a lesser amount of ethylene/propylene elastomer copolymer, equal to 5–50 parts by weight per 100 parts by weight of fluoroelastomer.

5. Fluoroelastomer compositions according to claim 1, wherein the fluoroelastomer is of the type vulcanizable with peroxides.

* * * * *